Dec. 6, 1938. A. McLACHLAN 2,139,415
STRAIN OR SUSPENSION CLAMP
Filed Sept. 22, 1936
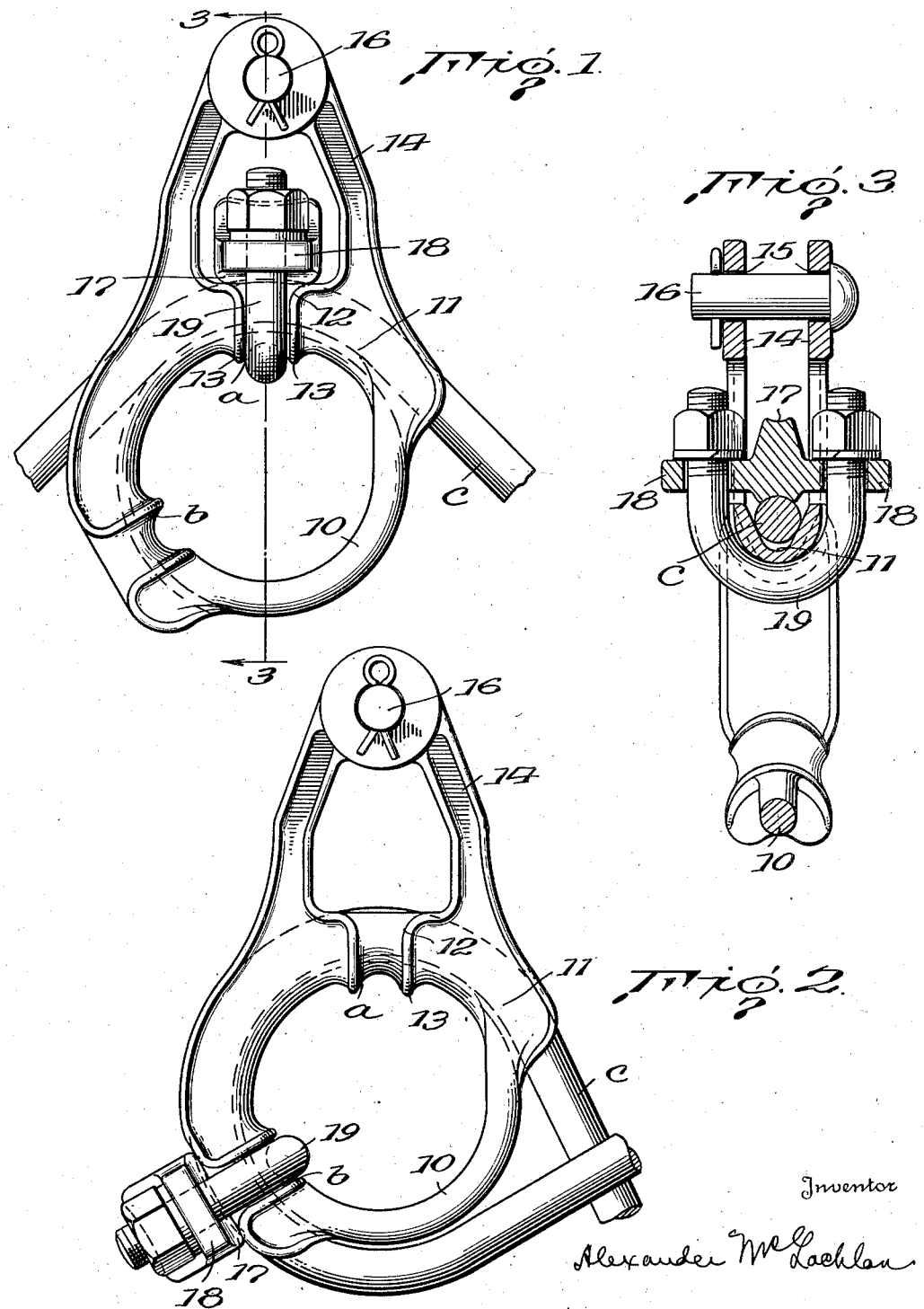

Patented Dec. 6, 1938

2,139,415

UNITED STATES PATENT OFFICE 2,139,415

STRAIN OR SUSPENSION CLAMP

Alexander McLachlan, Kenova, W. Va., assignor to Jeffery Dewitt Insulator Company, Kenova, W. Va., a corporation of West Virginia Application September 22, 1936, Serial No. 102,035

4 Claims. (Cl. 248—63)

This invention is a combined strain or suspension clamp for high tension electrical conductors.

One of the objects of the invention is to provide a clamp device so constructed and arranged that one type of clamp is selectively adapted for use at dead ends, corners, suspension, or pull-off points. A further object is to provide a device of the character mentioned in which a main clamp member is provided with a suspension position and a strain position, and a clamp member is removably engageable with the main clamp member at either of said positions, in such manner as to anchor a conductor cable which may be engaged with the main clamp member.

The invention will be hereinafter fully set forth and particularly pointed out in the claims.

In the accompanying drawing:—

Figure 1 is a side elevation showing the clamp with the parts arranged to suspend an electrical conductor. Figure 2 is a similar view illustrating the parts arranged to perform the strain functions. Figure 3 is a sectional view on the line 3—3, Figure 1.

Referring to the drawing, 10 designates the main body portion of the clamp member which may be of any desirable shape, but for purposes of illustration is shown as of general ring-like form and provided with an arcuate peripheral channel or conductor cable seat 11, preferably formed by laterally spaced flanges, so as to provide a seat for the conductor cable C. It will be noted that the side walls of the channel 11 are interrupted at circumferentially spaced positions by radially disposed sets of openings 12, which are flanged as indicated at 13, the said openings constituting relatively spaced cable anchor positions. For instance, the openings at $a$ constitute the suspension anchor-position, and the openings at $b$ constitute the strain anchor-position at which the device is to be used. The openings $a$ and $b$ provide proper clearance for bolts or other securing members of cable clamping means. It will be noted that the metal constituting the flanges of the channel 11 is extended upwardly and provide suspension arms 14, the upper ends of which have openings 15 therein to receive the suspension pin 16, by means of which the device may be suspended from any suitable form of support, such, for instance, as one or more suspension insulators (not shown).

The cable C may be anchored within the channel 11 by any suitable means, but for purposes of illustration a removable clamp member 17 is shown arranged transversely of the channel 11, at the suspension anchor-position $a$, the underside of said removable clamp member being provided with a concaved seat complemental to the cable $c$, and the lateral arms 18 of the clamp member being engaged by a U bolt 19, which is held in clamping position by means of the nuts 20. It is to be understood that the clamp member 17 and the U bolt 19 are disclosed merely for illustrative purposes and without intent to limit the invention to this particular form of clamping means.

In practice, when it is desired to use the device as a suspension clamp, it is suspended by means of the pin 16 from a suitable overhead support, and the clamp member 17 or its equivalent is clamped against the cable C at the position $a$ as indicated in Figure 1. Good practice requires that a suspension clamp for a high tension cable should be so constructed and arranged that the conductor may slip before the elastic limit of the conductor or support is reached. The clamp as utilized in the position illustrated in Figure 1, meets all of the requirements of good practice.

When it is desired to use the clamp for dead-ending or similar strain positions, it is only necessary to engage the clamp member 17 with the conductor C at the position $b$, as illustrated in Figure 2. The same clamp member 17 and its anchoring means is adapted for use in either position $a$ or $b$. While in use in the strain position, it is desirable that the grip be powerful enough to prevent slipping of the conductor even though it should break. These results are attained by the structure shown. For instance, it will be observed that the suspension arms 14 are of skeleton form and merge into the flanges which constitute the sides of the cable seat 11, at spaced positions along the latter. The openings $b$ are contiguous to one end of the cable seat 11 and the openings $a$ are located at a position between the skeletonized portions of the suspension arms 14. Therefore, while the bolt 19 engages the cable $c$ at seat $a$, said bolt is in an approximately vertical plane parallel with an imaginary line drawn downwardly from the centers of the openings 15, to the center of the arc of the cable seat, as illustrated in Figure 1; and while the bolt 19 engages the cable $c$ at the position $b$, the relation of the latter with respect to the suspension arms is such that the cable engages the seat 11 throughout the length of the latter, so that the anchoring functions of the clamp 17 and bolt 19 are greatly aided by a very substantial frictional engagement of the cable with its seat.

The advantages of the invention will be readily understood by those skilled in the art to which it belongs. One of the important advantages is that it permits line crews to carry but one type of clamp for dead ends, corners, suspension or pull-off points. An important factor is that it is possible to take advantage of a greater or lesser amount of the cable channel 11. That is to say, a larger number of degrees of snubbing arc are employed for dead ends, while a shorter arc is used at suspension points, so as to allow the conductor to slip before excessive stress is placed on the poles or cross arms, in case a conductor should break near the suspension point. This advantage will be more readily understood when it is borne in mind that only the dead end poles are normally guyed and constructed for such heavy strains.

Having thus explained the nature of the invention and described an operative manner of constructing and using the same, although without attempting to set forth all of the forms in which it may be made, or all of the forms of its use, what is claimed is:—

1. A combined strain and suspension clamp for high tension electrical conductors, comprising a clamp body, and suspension means therefor, said body having an arcuate conductor cable seat, anchor positioning means located contiguously to one end of said cable seat and another anchor positioning means located between the ends of the cable seat and contiguously to said suspension means, and a cable clamp so constructed and arranged as to be selectively engageable with the cable at either anchor position, whereby the same clamp body is adapted for selective use as a suspension clamp or a strain clamp, the first mentioned anchor positioning means being so located with respect to the suspension means that while the conductor cable is clamped at that position there will be frictional engagement of the cable with its seat throughout the length of said seat.

2. A combined strain and suspension clamp for high tension electrical conductors, comprising a clamp body, and suspension means therefor, said body having an arcuate conductor cable seat, anchor positioning means consisting of bolt seats extended radially across the sides of the cable seat contiguously to one end of the latter, and another anchor positioning means also consisting of bolt seats extended radially across the sides of the cable seat, the second bolt seats being located between the ends of the cable seat and contiguously to the suspension means, and a cable clamp, and a bolt member so constructed and arranged as to be selectively engageable with either of the bolt seats and to engage said clamp at either anchor position, whereby the same clamp body is adapted for selective use as a suspension clamp or a strain clamp, the first mentioned anchor means being so located with respect to the suspension means that while the conductor cable is clamped at that position there will be a frictional engagement of the cable with its seat throughout the length of said seat.

3. A combined strain and suspension clamp for high tension electrical conductors comprising a clamp body, said body having an arcuate conductor cable seat, suspension arms of skeleton form having their lower ends merge into and forming parts of said flanges, the outer ends of said suspension arms having aligned pin receiving openings, anchor positioning means located contiguously to one end of said cable seat and another anchor positioning means located between the ends of the cable seat in a plane corresponding to an imaginary line connecting the centers of said openings and the center of the arc of said conductor cable seat, and a cable clamp so constructed and arranged as to be selectively engageable with the cable at either anchor position, whereby the same clamp body is adapted for selective use as a suspension clamp or a strain clamp, the first mentioned anchor positioning means being so located with respect to the suspension arms that while the conductor cable is clamped at that position there will be a frictional engagement of the cable with its seat throughout the length of said seat.

4. A combined strain and suspension clamp for high tension electrical conductors, comprising a clamp body having an arcuate portion provided with sides constituting an arcuate conductor cable seat, suspension arms merging into and connected with the sides of said cable seat and including skeleton arms provided with aligned pin receiving openings, anchor positioning means including bolt seats extending radially across the sides of said cable seat and located contiguously to one end of the latter, a second anchor positioning means also including bolt receiving seats disposed radially across the sides of the cable seat and in a plane parallel with an imaginary line drawn from the centers of said openings to the center of the arc of said cable seat, a cable clamp so constructed and arranged as to be selectively engageable with the cable at either anchor position and a bolt complemental to both bolt seats and adapted to selectively engage said bolt seats at either anchor position, so that the same clamp body is adapted for selective use as a suspension clamp or a strain clamp, the first mentioned bolt seats being so located with respect to the suspension means that while the conductor cable is clamped at that position there will be a frictional engagement of the cable with its seat throughout the length of said seat, the second bolt seats being so disposed with respect to the suspension means that they extend into the space between said suspension arms.

ALEXANDER McLACHLAN.